United States Patent [19]

Vice et al.

[11] 3,882,274

[45] May 6, 1975

[54] BIDIRECTIONAL DIGITAL AMPLIFIER

[75] Inventors: William E. Vice; Arthur J. Brodersen; Gerald J. Lipovski, all of Gainesville, Fla.

[73] Assignee: Board of Regents, State of Florida, Tallahassee, Fla.

[22] Filed: Feb. 28, 1974

[21] Appl. No.: 446,797

[52] U.S. Cl. ..... 178/70 TS; 179/15 AD; 179/170 T

[51] Int. Cl. .......................................... H04l 25/24

[58] Field of Search .. 178/58 R, 58 A, 71 R, 70 TS; 179/15 AD, 170 T, 170 R; 328/34, 164; 330/51, 155; 325/13

[56] References Cited

UNITED STATES PATENTS 3,519,765 7/1970 Huber ........................... 179/170 T 3,673,326 6/1972 Lee ................................ 178/71 R

*Primary Examiner*—David L. Stewart

*Attorney, Agent, or Firm*—George H. Baldwin; Arthur G. Yeager

[57] ABSTRACT

This invention relates to a bi-directional digital amplifier for use in cellular switching circuits and in cellular computers and which is capable of propagating a signal in respectively opposite directions without degrading the signal and which is capable of delimiting such propagation in either or both directions. The amplifier requires no clock signals for operation, will not latch up in response to noise and is well suited for construction in the form of an integrated circuit chip.

9 Claims, 5 Drawing Figures

BIDIRECTIONAL DIGITAL AMPLIFIER

BACKGROUND OF THE INVENTION

This invention relates to a bi-directional digital amplifier.

Cellular processors are being studied with considerable interest because of their inherent fail-soft operation, extendable architecture, and the fact that many copies of the same cell are all that is needed to build a large computer. A cellular processor consists of a large number of cells, which are physically identical, interconnected in a structure such as the two dimensional array in FIG. 1. It can be fial-soft because the processor can operate at reduced capacity if one or more cells are made inoperable. It is extendable because a large processor can be made from a smaller one simply by adding more cells to the perimeter of the structure. Because many identical copies of one cell can be connected to build a large processor, it is ideally suited to LSI fabrication.

Two techniques are used in cellular processors for intercell communication. In one class of processors, each cell can "grow" a path, by causing links to be connected from one cell to another. These paths are grown and disconnected under program control. In another class, a group of cells are tied together by connected paths the same way for the duration of execution of a program. An instruction is broadcast from one cell at a time to all cells simultaneously in the same event on the connected paths. For example, a group of cells will sequentially broadcast instructions (one at a time) to cause the other cells to search for a pattern in a data structure, as described in an article by Gerald J. Lipovski, entitle Data Structures In Context-Addressed Cellular Memories, published in the International Journal of Computer and Information Sciences, Vol. 1, Nov. 4, 1972. This class of processors can be arranged so that the paths can be re-connected after a program is over. This permits a large cellular processor to be "space-shared" by running several programs in different parts of the processor at the same time. And by joining and splitting these connected groups of cells, a complex program can be executed.

Polymorphic and multiprocessor computers are also being studied for similar reasons to those given for cellular processors. The modules in such computers are interconnected by cross-point switches or other cellular switching networks. In these switching networks, the same two techniques are used to provide communication paths.

In both types of cellular processors, and in switching networks an intercell communication path must be realized. We now look at the essential requirements of these paths.

Consider a network of cells such as that shown in FIG. 1. In such a network any cell may broadcast data onto lines and many cells (but not necessarily all) may receive the data on these lines. No cell may both broadcast and receive simultaneously on the same line. If each cell were required to provide sufficient power to broadcast data to all other cells, either the system would have to be very small or the amplifiers at the output of each cell would have to be capable of providing sufficient power to drive the inputs of a large number of cells. It follows that each cell should broadcast through a network of amplifiers. At one time a cell may transmit data and at another time it may receive data.

Therefore, the amplifiers need to be bi-directional or be pairs of unidirectional amplifiers. Since the transmitting cell may be arbitrarily far from the receiving cell, the amplifiers must not degrade the voltage levels of the signal.

As noted earlier, it is desirable to broadcast the data, not to all cells, but only to certain preselected cells. In order to do this it is necessary that the amplifier be electronically controlled so that it will transmit a signal only when desired.

A major problem in a system of this kind is the detection and elimination of faults. It is obvious that if a fault were to occur in a system where all cells are connected by bi-directional amplifiers, a stuck-on-one error could be transmitted throughout the system. To locate and eliminate such errors, it is necessary for the amplifiers to be designed so that transmission may be permitted in only one direction when required. With this unidirectional control, a defective cell may be located and pruned from the network, but other cells will not be interfered with, and can be checked out.

Some of the prior art bi-directional digital amplifiers have one major disadvantage: they latch. This gives rise to a serious problem. When a logic 1 or 0, (depending on the circuit) is applied to one of the inputs, the other input will become a logic 1 (or o). Because of the positive feedback resulting from the bi-directional nature of the device, however, both inputs will remain at the logic 1 (or 0) level when the original signal is removed. Any noise signal can cause latching and, therefore, an erroneous output from the device. This situation can be disastrous in a large system. A clock is needed to "unlatch" the device to its original state. This clock must be differently phased than the clock used by flip-flops.

OBJECTS OF THE INVENTION

It is therefore one object of the invention to provide a bi-directional digital amplifier that does not degrade the signal.

It is another object of the invention to provide a bi-directional digital amplifier that is capable of transmitting in only one direction when required.

It is a further object of the invention to provide a bi-directional amplifier capable of completely stopping transmission when required (total on-off control).

It is a still further object of the invention to provide a bi-directional digital amplifier of such character that it can be easily fabricated as an integrated circuit chip.

Various other objects, advantages and features of this invention will become apparent from the following detailed description taken in conjunction with the accompanying drawings in which.

THE INVENTION

Figure 1:
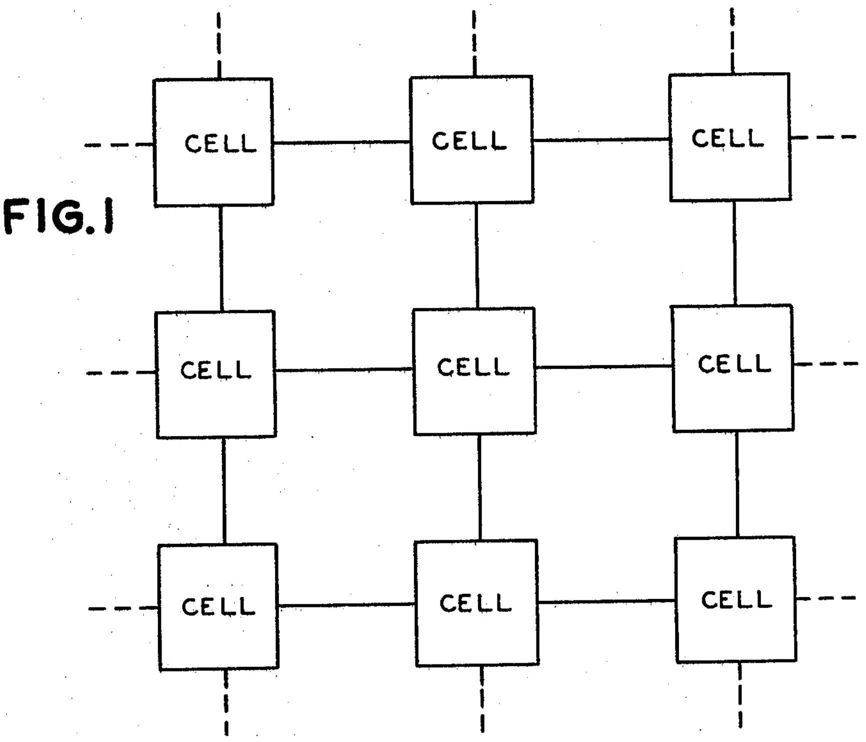
FIG. 1 is a two-diminensional array of interconnected cells.
Figures 2, 3:
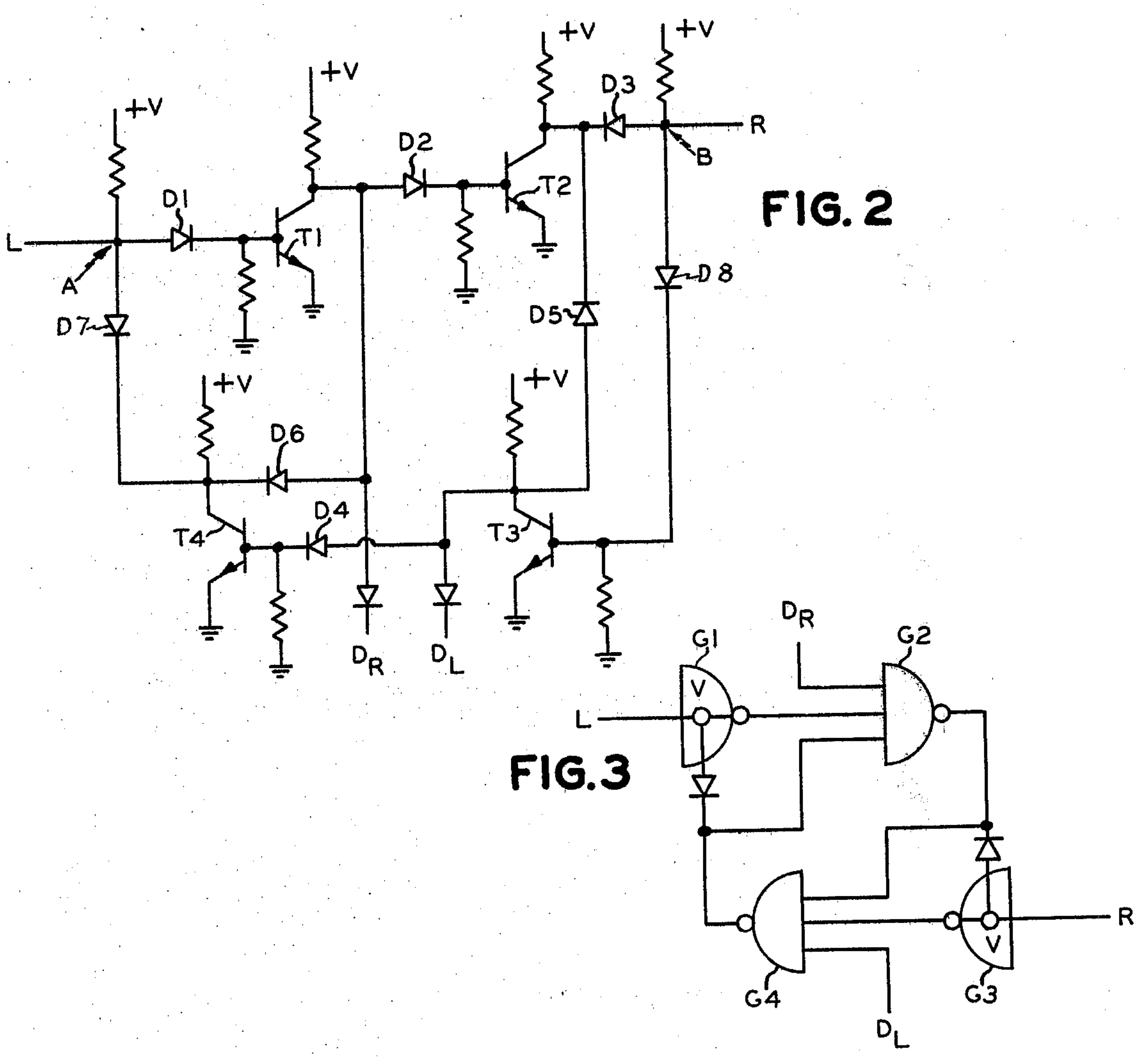
FIG. 2 is a schematic of the bi-directional amplifier of this invention.
FIG. 3 depicts the bi-directional amplifier of FIG. 2 in the form of a plurality of interconnected logic gates.

The bi-directional amplifier of this invention is capable of stopping or "delimiting" the transmission of a signal in either direction when required. With reference to FIG. 2 of the drawing, if the amplifier is delimiting in both directions the voltage values at L and R are independent of each other. When the amplifier is right delimiting, the output at R is independent of the value applied at A, but the output at L is made logic 1 if the input at R is logic 1. Similarly, if the amplifier is left delimiting, the output at L is independent of the input at B, but the output at R becomes logic 1 when the input at A is logic 1.

Table 1 below, shows a logic definition of our bidirectional amplifier. Outputs L and R are shown for all combinations of inputs A and B and delimits $D_R$ and $D_L$, which are left and right delimits. See FIG. 2. We will assume a logic 0 on a delimit input causes delimiting. It is important to recognize the difference between the logic level at an input and the logic level of an external signal applied to that input. The former may be the wired-OR of the latter and other inputs.

In the table, a logic 1 applied to the inputs of A and B signifies the application of a low signal voltage, while a logic 1 applied to terminals $D_R$ and $D_L$ signifies the application of a high voltage thereto.

TABLE 1

| $D_L$ | $D_R$ | A | B | L | R |
|---|---|---|---|---|---|
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 0 | 0 |
| 0 | 1 | 0 | 1 | 0 | 1 |
| 0 | 1 | 1 | 0 | 1 | 1 |
| 0 | 1 | 1 | 1 | 1 | 1 |
| 1 | 0 | 0 | 0 | 0 | 0 |
| 1 | 0 | 0 | 1 | 1 | 1 |
| 1 | 0 | 1 | 0 | 1 | 0 |
| 1 | 0 | 1 | 1 | 1 | 1 |
| 1 | 1 | 0 | 0 | 0 | 0 |
| 1 | 1 | 0 | 1 | 1 | 1 |
| 1 | 1 | 1 | 0 | 1 | 1 |
| 1 | 1 | 1 | 1 | 1 | 1 |

With reference to FIG. 2, A and B represent the signal inputs to the left and right amplifiers respectively, and L and R represent the left and right output terminals at which signals appear in response to the application of the input and delimiting signals. For transmission from A to R, an input signal is applied to an input transistor aplifier T1, the output of which is applied to the input terminal of output transistor amplifier T2, the signal normally being repeated at R. In the same way a signal applied at B will normally be propagated to the left to appear at L through input transistor T3 and output transistor T4. As noted above, it is desired to delimit or stop transmission of signals in either or both directions at will. To this end, a diode $D_R$ has its anode connected to the collector electrode of transistor T1 and its cathode to a source of digital logic signals. A further diode $D_L$ has its anode connected to the collector of T3 and its cathode to a second source of digital logic signals. A high voltage applied to the cathodes of the diodes $D_R$ and $D_L$ will be considered as a logic 1 as used in table I. A low voltage applied to the cathodes of $D_R$ and $D_L$ is considered as logic 0. This designation is opposite to that used for the signals applied to inputs A and B wherein a logic 1 is a low voltage signal and a logic 0 is a high voltage signal.

In the following explanation of the schematic shown in FIG. 2, it is assumed that a logic 1 has been applied to the diodes $D_R$ and $D_L$ that is, their cathodes are at high potential so that transistor T1 is cut off. The resulting high voltage at the collector of T1 applied through diode D2 to the base of transistor T2 causes the latter to conduct so that the collector approaches ground potential, causing the terminal R to assume a low potential through diode D3. At this point both L and R terminals are at a low or 1. Terminal R remains at such low potential even if a high voltage or 0 is applied to terminal R at this time. Reference to Table I will show that where both $D_R$ and $D_L$ are at a high voltage or 1, a low voltage or 1 applied to amplifier A will result in a 1 at terminal R, and a high voltage or a 0 applied to amplifier B at this time will result in 1 at terminal L.

Now with the cathode at $D_R$ at a low voltage or 0 for delimiting or stopping transmission to the right and the cathode of $D_L$ at a high voltage or 1, the collector of transistor T1 of amplifier A is at a low potential. A high voltage or 0 applied to the base of transistor T1 will not be transmitted to the right terminal R under these conditions. If at this time a low voltage or a 1 appears on the input B of the amplifier, transistor T3 becomes nonconductive, T4 goes into conductivity so that the output at terminal L is low or a 1. It should be noted at this point that by reason of the diode D5 connected between the collector of T2 and the input of T4, that whenever there is a logic 1 or a low on the input A, the output of transistor T4 will always be a high or logic 0. Also, due to the connection of diode D6 between the collector of T4 and the input of T2, when the input at R if made low, the output at the collector of T2 is high. This requires the installation of several disconnect diodes, including diodes D7 and D8 poled or oriented as shown, to prevent the establishment of other unwanted feedback paths. As a result, the circuit becomes basically four interconnected AND gates. This is shown in FIG. 3, where gates G1 and G3 are really distributed logic OR gates with inverters. By the term "distributed OR" gate is meant that the inputs to the OR gate may be physically in separate modules and the output of the OR gate is available to all modules. Thus, positive feedback and latching up of the circuits are avoided. With such latching up transistors T2 and T4 would saturate and keep inputs L and R low respectively, even if they tried to change to high.

Figure 5:
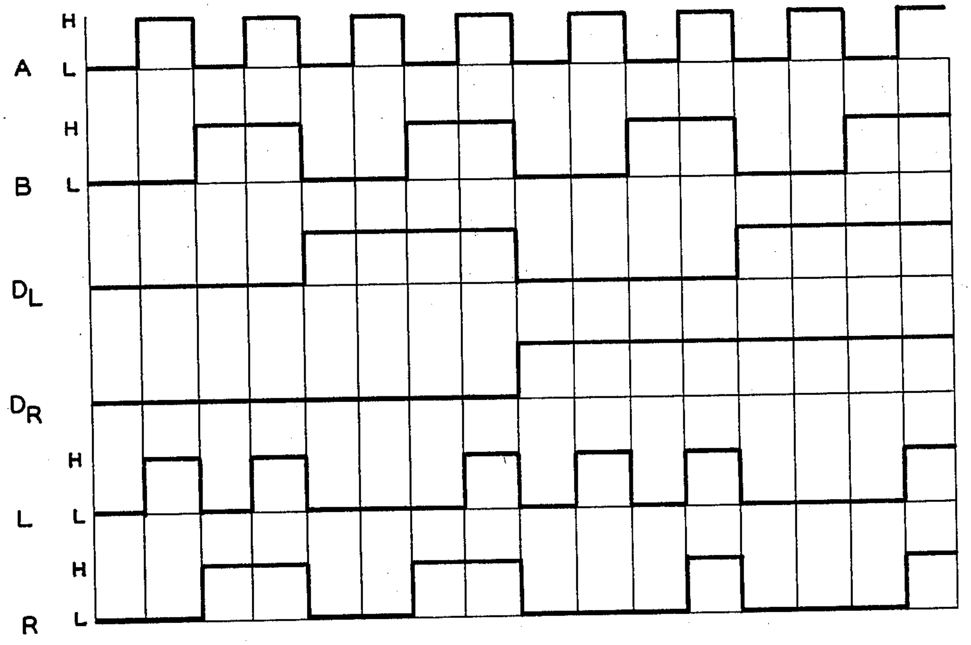
FIG. 5 shows the voltage levels for all combinations input and delimit signals and the output voltage levels.

FIG. 5 shows the voltage levels at outputs L and R of the circuit shown in FIGS. 2 and 3 for the two respective inputs applied at A and B for all combinations of signals and delimit inputs at $D_R$ and $D_L$. The voltages shown in the above table were derived from a computer which is capable of being programmed in such a way as to allow any digital circuit to be modeled and its performance evaluated. Comparison of this figure with Table 1 shows that the circuit functions as required and does not latch.

Table 2 below shows the output of each gate at intervals of one gate delay. Part (a) shows the result of starting with both L and R at high voltage and then changing L to low. In part (b), we see the effect of changing input L to low for one gate delay time. Here the circuit is seen to oscillate. This can be seen by the repetition of the states between one gate delay time and five gate delay times.

TABLE 2

LOGIC LEVELS FOR BIDIRECTIONAL AMPLIFIER OF FIGS. 2 AND 4

(a) Input L Changing from High to Low

| Delay Times | A | B | $D_L$ | $D_R$ | Gl | L | R |
|---|---|---|---|---|---|---|---|
| 0 | high | high | high | high | low | high | high |
| 1 | low | high | high | high | low | low | high |
| 2 | low | high | high | high | high | low | high |
| 3 | low | high | high | high | high | low | low |

(b) Input L at Low for One Gate Delay Time

| Delay Times | A | B | $D_L$ | $D_R$ | Gl | L | R |
|---|---|---|---|---|---|---|---|
| 0 | high | high | high | high | low | high | high |
| 1 | low | high | high | high | low | low | high |
| 2 | high | high | high | high | high | high | high |
| 3 | high | high | high | high | low | high | low |
| 4 | high | high | high | high | low | high | high |
| 5 | high | high | high | high | low | low | high |

The instability results from the internal feedback in this circuit. This would not cause any problems in most circuits, because the input signals are present sufficiently long to prevent oscillations. The circuit would, however, be unsuitable for input signals that were in the order of one delay time in length or in the presence of large amplitude, short duration noise.

Figure 4:
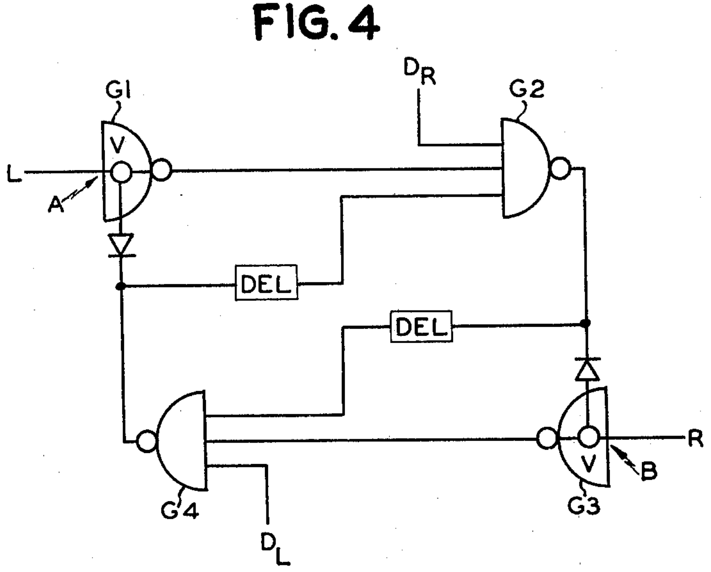
FIG. 4 depicts the form of amplifier shown in FIG. 3 with the addition of a pair of delay devics.

The circuit can be modified to eliminate the instability. The modification consists of the addition of two delays DEL, comprised of one gate delay time each. This modified circuit which is a preferred embodiment is shown in FIG. 4. The gate levels are shown in Table 3 below, for short duration input signals. With this modification, the circuit no longer becomes unstable.

TABLE 3

LOGIC LEVELS FOR BIDIRECTIONAL AMPLIFIER OF FIG. 4

(a) Input L Changing from High to Low

| Delay Times | A | B | $D_L$ | $D_R$ | Gl | L | R |
|---|---|---|---|---|---|---|---|
| 0 | high | high | high | high | low | high | high |
| 1 | low | high | high | high | low | low | high |
| 2 | low | high | high | high | high | low | high |
| 3 | low | high | high | high | high | low | low |

(b) Input L at Low for One Gate Delay Time

| Delay Times | A | B | $D_L$ | $D_R$ | Gl | L | R |
|---|---|---|---|---|---|---|---|
| 0 | high | high | high | high | low | high | high |
| 1 | low | high | high | high | low | low | high |
| 2 | high | high | high | high | high | high | high |
| 3 | high | high | high | high | low | high | low |
| 4 | high | high | high | high | low | high | high |

The total delay from input to output for either modified circuit is the delay through two gates. While the amplifier of FIGS. 2 and 3 is unstable if operated too fast, the amplifier of FIG. 4 is stable under all conditions if the delays are matched. If gate delays are different, the circuit is unstable for pulses whose ON-time is equal to the difference of the gate delays. For low speed operation the amplifier of FIGS. 2 and 3 without the delays is the simpler. However, for high speed operation, the two delays are required to maintain the stability of the circuit. and the delays must be matched so that the delay difference is no larger than the ON-time of the shortest pulse in the amplifier.

To show the practicality of these circuits, the amplifier of FIGS. 2 and 3 was constructed as an integrated circuit. A DTL (diode transistor logic) implementation of it was chosen because this type circuit is easier to construct with the equipment available. The circuit was manufactured in the University of Florida Microelectronics Laboratory.

An evaluation of the completed circuit confirmed that its operation was as described earlier and shown in FIG. 5. The circuit was shown to be capable of operation up to approximately 2 Mhz. Although this is almost an order of magnitude slower than some DTL circuits, it should be pointed out that the circuit constructed was not designed for maximum speed.

As heretofore stated, the amplifiers of FIGS. 2, 3 and 4 are simple and lends itself to be economically produced as an integrated circuit on a small chip;

Having thus described the invention with the particularities required by the statutes, it will be obvious to those skilled in the art that various changes and modifications may be made herein without departing from the spirit and scope of the invention as defined by the appended claims.

What is claimed is:

1. A bi-directional signal translating device for transmitting signals in two directions along a path, said translating means including first amplifier means for propagating in a first direction a signal applied to its input and a second amplifier for propagating in the second direction a signal applied to its input, means responsive to a signal applied to the input of each one of said amplifier means for blocking propagating of a signal applied to the input of the other one of said amplifier means, means for connecting in common the input of said first amplifier means and the output of said second amplifier means including a first unidirectional conducting device, means for connecting in common the input of said second amplifier means and the output of said first amplifier means including a second unidirectional conducting device, and means for selectively applying delimiting control signs at preselected times to either one amplifier means or simultaneously to both amplifier means, for blocking propagation of input signals therethrough.

2. A bi-directional signal translating device according to claim 1 wherein each amplifier means comprises an input transistor to which signals having either one of two voltages states are applied, and an output transistor, said control signals being pulse signals having either one of two voltage states.

3. A bi-directional signal translating device according to claim 2 wherein the transistors of both amplifier means are so interconnected that signals of opposite voltage states applied to the inputs of the respective amplifier means with a delimiting control signal of one voltage state applied to only one of said amplifier means will result in an output signal of the same state from both amplifier means.

4. A bi-directional signal translating device according to claim 2 wherein the transistors of both amplifier means are so interconnected that signals of opposite states applied to the inputs of the respective amplifier means with a non-delimiting control signal applied to both amplifier means will result in an output signal of the same voltage state from both amplifier means.

5. A bi-directional signal translating device according to claim 2 wherein the transistors of the first and second amplifier means are connected to operate in a common emitter configuration and are all of the same conductivity type.

6. A bi-directional signal translating device according to claim 2 including delay circuit means for delaying the response time of the means for blocking propagation of signals in each of the amplifier means following application of a signal pulse to its respective input.

7. A bi-directional signal translating device according to claim 6 wherein the length of said delay time is substantially the time between two successive pulse input signals to an amplifier means.

8. A bi-directional signal translating device according to claim 2 wherein said means for blocking is operative, in response to a low voltage signal applied to the input transistor of one of said amplifier means, to cause the output transistor of the other amplifier means to assume a state of high impedance, said unidirectional conductive devices being oriented to decouple the output transistor of each said amplifier means from the respective input transistor of the other amplifier means, when the respective output transistor is in a high inpedance state.

9. A bi-directional signal translating device according to claim 1 wherein each amplifier means comprises an input transistor to which pulse signals having either one of two voltage states are applied, and an output transistor, said control signals being pulse signals having either one of two voltage states and of substantially the same duration as the signals applied to the input transistors.

* * * * *